US012752610B2

(12) United States Patent
Kuipers et al.

(10) Patent No.: US 12,752,610 B2
(45) Date of Patent: Oct. 6, 2026

(54) VEHICLE BEAM COMPONENT WITH TRANSVERSE STIFFENING ARRAY

(71) Applicant: Shape Corp., Grand Haven, MI (US)

(72) Inventors: Matthew Kuipers, Holland, MI (US); Zehua Qin, Norton Shores, MI (US)

(73) Assignee: Shape Corp., Grand Haven, MI (US)

( * ) Notice: Subject to any disclaimer, the term of this patent is extended or adjusted under 35 U.S.C. 154(b) by 385 days.

(21) Appl. No.: 18/480,999

(22) Filed: Oct. 4, 2023

(65) Prior Publication Data

US 2024/0109401 A1 Apr. 4, 2024

Related U.S. Application Data

(60) Provisional application No. 63/378,315, filed on Oct. 4, 2022.

(51) Int. Cl.
*B60J 5/04* (2006.01)
*B62D 25/02* (2006.01)

(52) U.S. Cl.
CPC .......... *B60J 5/0444* (2013.01); *B62D 25/025* (2013.01)

(58) Field of Classification Search
CPC ............................ B60J 5/0444; B62D 25/025
See application file for complete search history.

(56) References Cited

U.S. PATENT DOCUMENTS

| | | | | |
|---|---|---|---|---|
| 1,895,171 | A | 1/1933 | Nelson et al. | |
| 2,012,057 | A | 8/1935 | Swallow | |
| 4,221,413 | A | 9/1980 | Bonnetain | |
| 5,680,886 | A | 10/1997 | Ohtsuka | |
| 6,435,601 | B1 | 8/2002 | Takahara | |
| 7,963,378 | B2 | 6/2011 | Glance et al. | |
| 9,493,190 | B1 * | 11/2016 | Alwan | B62D 25/025 |
| 9,725,118 | B2 | 8/2017 | Alwan et al. | |

(Continued)

FOREIGN PATENT DOCUMENTS

| | | | |
|---|---|---|---|
| DE | 102007032245 | A1 | 1/2009 |
| DE | 102010003497 | A1 | 10/2011 |

(Continued)

OTHER PUBLICATIONS

International Search Report for Application No. PCT/US2023/016452; mailed Jun. 13, 2023; 3 pp.

(Continued)

*Primary Examiner* — Faye M Fleming
(74) *Attorney, Agent, or Firm* — Bodman PLC

(57) ABSTRACT

A vehicle beam component includes an elongated beam having a first wall, a second wall, and a third wall interconnecting the first and second walls to define a channel along a length of the elongated beam. The vehicle beam component also includes an array of stiffening members secured in the channel and disposed along the elongated beam in a spaced arrangement that is configured to stiffen the elongated beam from a laterally directed impact at a majority section of the length. Each stiffening member of the array of stiffening members extends between and is secured to the first and second walls of the elongated beam. Each stiffening member also includes a wall portion that is disposed orthogonal to the third wall of the elongated beam and transverse to the length of the beam, such that the wall portion is configured to axially absorb the laterally directed impact.

20 Claims, 12 Drawing Sheets

(56) References Cited

U.S. PATENT DOCUMENTS

| | | | | |
|---|---|---|---|---|
| 10,011,304 | B1 | 7/2018 | Donabedian et al. | |
| 10,046,422 | B2 | 8/2018 | Baldwin | |
| 10,155,542 | B2 | 12/2018 | Gao et al. | |
| 10,183,638 | B2 | 1/2019 | Zannier | |
| 10,279,843 | B2 | 5/2019 | Nakagawa et al. | |
| 10,328,978 | B2 | 6/2019 | Yang et al. | |
| 10,370,040 | B1 * | 8/2019 | Cooper | B62D 21/157 |
| 10,399,602 | B2 | 9/2019 | Jun et al. | |
| 10,835,942 | B2 | 11/2020 | Weykamp et al. | |
| 11,046,367 | B2 * | 6/2021 | Arvidsson | B62D 25/025 |
| 11,292,407 | B2 | 4/2022 | Riva | |
| 11,535,298 | B2 * | 12/2022 | Son | B62D 21/157 |
| 11,661,111 | B2 * | 5/2023 | Kuipers | B62D 21/157 296/209 |
| 11,745,802 | B2 | 9/2023 | Song | |
| 12,043,314 | B2 | 7/2024 | Bodin et al. | |
| 12,415,569 | B2 * | 9/2025 | Kuipers | B62D 21/157 |
| 12,448,049 | B2 | 10/2025 | Munjurulimana et al. | |
| 2019/0256150 | A1 | 8/2019 | Cooper et al. | |
| 2019/0264769 | A1 | 8/2019 | Gergely et al. | |
| 2020/0262491 | A1 | 8/2020 | Shannon et al. | |
| 2021/0268976 | A1 | 9/2021 | Gibeau et al. | |
| 2021/0339803 | A1 | 11/2021 | Haupt et al. | |
| 2021/0380173 | A1 | 12/2021 | Kim | |
| 2022/0063731 | A1 | 3/2022 | Tsubaki et al. | |
| 2022/0212720 | A1 | 7/2022 | Oxley et al. | |
| 2022/0250565 | A1 | 8/2022 | Godthi et al. | |
| 2022/0258802 | A1 | 8/2022 | Tsubaki et al. | |
| 2022/0289298 | A1 | 9/2022 | Kuipers | |
| 2022/0315110 | A1 | 10/2022 | Ignes et al. | |
| 2022/0410982 | A1 | 12/2022 | Hihara | |
| 2023/0011721 | A1 | 1/2023 | Boettcher et al. | |
| 2023/0016200 | A1 | 1/2023 | Matsui et al. | |
| 2023/0072451 | A1 | 3/2023 | Song | |
| 2023/0102921 | A1 | 3/2023 | Odhekar et al. | |
| 2023/0108456 | A1 | 4/2023 | Karlsson et al. | |
| 2023/0111879 | A1 | 4/2023 | Oxley et al. | |
| 2023/0126494 | A1 | 4/2023 | Nihei | |
| 2023/0147528 | A1 | 5/2023 | Qin et al. | |
| 2023/0159107 | A1 | 5/2023 | Matecki et al. | |
| 2023/0159110 | A1 | 5/2023 | Hwang | |
| 2023/0202578 | A1 | 6/2023 | Maruyama | |
| 2023/0202581 | A1 | 6/2023 | Maruyama et al. | |
| 2023/0202582 | A1 | 6/2023 | Inagaki et al. | |
| 2023/0219628 | A1 | 7/2023 | Hong et al. | |
| 2023/0226898 | A1 | 7/2023 | Lee et al. | |
| 2023/0303179 | A1 | 9/2023 | Kuipers et al. | |
| 2023/0347986 | A1 * | 11/2023 | Kuipers | B62D 25/025 |
| 2024/0083513 | A1 * | 3/2024 | Kuipers | B62D 21/157 |
| 2024/0092426 | A1 | 3/2024 | Park et al. | |
| 2024/0109401 | A1 | 4/2024 | Kuipers et al. | |
| 2024/0286685 | A1 | 8/2024 | Lee et al. | |
| 2024/0308593 | A1 * | 9/2024 | Kuipers | B62D 25/025 |
| 2024/0326916 | A1 | 10/2024 | Lee | |

FOREIGN PATENT DOCUMENTS

| | | | | |
|---|---|---|---|---|
| DE | 102014012082 | A1 | 2/2016 | |
| DE | 102012206032 | B4 | 6/2017 | |
| DE | 102017006057 | B4 | 5/2021 | |
| EP | 1331160 | A1 | 7/2003 | |
| EP | 1806271 | A2 | 7/2007 | |
| EP | 2927101 | A1 | 10/2015 | |
| EP | 3057851 | B1 | 1/2018 | |
| EP | 3851335 | A1 | 7/2021 | |
| FR | 3050165 | A1 | 10/2017 | |
| JP | H05319301 | A | 12/1993 | |
| JP | 2004051095 | A | 2/2004 | |
| JP | 2010274848 | A | 12/2010 | |
| JP | 2016052834 | A | 4/2016 | |
| JP | 6566176 | B1 | 8/2019 | |
| JP | 2021024350 | A | 2/2021 | |
| JP | 2021146973 | A | 9/2021 | |
| JP | 6964642 | B2 | 10/2021 | |
| KR | 102447256 | B1 * | 9/2022 | B62D 29/008 |
| KR | 102356464 | B9 | 11/2024 | |
| WO | 2017157886 | A1 | 9/2017 | |
| WO | 2019059821 | A1 | 3/2019 | |
| WO | 2020085385 | A1 | 4/2020 | |
| WO | 2020225766 | A1 | 11/2020 | |
| WO | 2020247903 | A1 | 12/2020 | |
| WO | 2021019959 | A1 | 2/2021 | |
| WO | 2021060660 | A1 | 4/2021 | |
| WO | 2021071410 | A1 | 4/2021 | |
| WO | 2021116546 | A1 | 6/2021 | |
| WO | 2021157651 | A1 | 8/2021 | |
| WO | 2021180403 | A1 | 9/2021 | |
| WO | 2021234433 | A1 | 11/2021 | |
| WO | 2021244792 | A1 | 12/2021 | |
| WO | 2021259840 | A1 | 12/2021 | |
| WO | 2021259971 | A1 | 12/2021 | |
| WO | 2022086005 | A1 | 4/2022 | |
| WO | 2022192706 | A1 | 9/2022 | |
| WO | 2022234999 | A1 | 11/2022 | |
| WO | 2022238458 | A1 | 11/2022 | |
| WO | 2022249782 | A1 | 12/2022 | |
| WO | 2023004309 | A1 | 1/2023 | |
| WO | 2023277440 | A1 | 1/2023 | |
| WO | 2023277441 | A1 | 1/2023 | |
| WO | 2023277567 | A1 | 1/2023 | |
| WO | 2023285005 | A1 | 1/2023 | |
| WO | 2023012056 | A1 | 2/2023 | |
| WO | 2023014808 | A1 | 2/2023 | |
| WO | 2023016113 | A1 | 2/2023 | |
| WO | 2023044429 | A1 | 3/2023 | |
| WO | 2023052279 | A1 | 4/2023 | |
| WO | 2023052388 | A1 | 4/2023 | |
| WO | 2023064868 | A1 | 4/2023 | |
| WO | 2023069918 | A1 | 4/2023 | |
| WO | 2023079804 | A1 | 5/2023 | |
| WO | 2023079805 | A1 | 5/2023 | |
| WO | 2023081810 | A1 | 5/2023 | |
| WO | 2023085162 | A1 | 5/2023 | |
| WO | 2023085689 | A1 | 5/2023 | |
| WO | 2023088660 | A1 | 5/2023 | |
| WO | 2023089887 | A1 | 5/2023 | |
| WO | 2023090112 | A1 | 5/2023 | |
| WO | 2023090706 | A1 | 5/2023 | |
| WO | 2023094389 | A1 | 6/2023 | |

OTHER PUBLICATIONS

Search Report for Application No. PCT/US2023/060333; mailed May 4, 2023; 4 pp.

Search Report for Application No. PCT/US2023/066406; mailed Aug. 21, 2023; 5 pp.

Search Report for Application No. PCT/US2023/074116; mailed Jan. 18, 2024; 5 pp.

Search Report for Application No. PCT/US2024/020186; mailed Jun. 27, 2024; 3 pp.

International Search Report for Application No. PCT/US2023/076015; mailed Mar. 12, 2024; 4 pp.

* cited by examiner

VEHICLE BEAM COMPONENT WITH TRANSVERSE STIFFENING ARRAY

CROSS-REFERENCE TO RELATED APPLICATION

This application claims benefit and priority under 35 U.S.C § 119(e) to U.S. Provisional Patent Application No. 63/378,315, filed Oct. 4, 2022, the disclosure of which is considered part of this application and is hereby incorporated by reference in its entirety.

TECHNICAL FIELD

The present disclosure relates to structural members and beams, and more particularly relates to vehicle components, such as for use as structural and reinforcement beams on rocker assemblies, battery trays, and other vehicle frame structures and the like.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact forces to be mitigated to reduce the associated intrusion distance from the side impact. For example, it is generally known to increase stiffness of a vehicle sill assembly, such as by adding a rocker insert within the vehicle sill assembly.

SUMMARY

The disclosure provides a vehicle beam component, such as a rocker component or assembly, with a plurality of stiffening members that are disposed transverse to a corresponding beam and secured relative to the beam to provide the overall component with improved bending strength and crush resistance along its length. The stiffening members may also be spaced in intervals that are designed to cooperatively under impact loading by distributing impact loads across multiple adjacent stiffening members. In some examples, the beam assembly may be a vehicle rocker assembly that includes a stiffening member disposed within the hollow interior of a rocker assembly. The beam may have a top wall, a bottom wall, and a side wall, such as to form a C-shape cross-section or channel along the length of the beam. The transverse wall sections of the stiffening members may each include an upper portion engaged with the top wall of the channel and a lower portion engaged with the bottom wall of the channel. The beam and stiffening members function cooperatively in side impact energy management, such as by having the top and bottom walls of the beam supported away from each other by the array of stiffening members when undergoing the inboard lateral impact force to increase lateral bending strength of the rocker insert. The transverse wall sections of the array of stiffening member are also configured to align with the lateral impact load to provide high crush resistance and stiffness to the rocker section. The combined properties of the beam and stiffening members, along with the predetermined spaced arrangement of the transverse stiffening members, provides enhanced resistance to intrusion as a result of side impacts along the length of the beam component.

According to one aspect of the disclosure, a vehicle beam component includes an elongated beam having a first wall, a second wall, and a third wall interconnecting the first and second walls to define a channel along a length of the elongated beam. The vehicle beam component also includes an array of stiffening members secured in the channel and disposed along the elongated beam in a spaced arrangement that is configured to stiffen the elongated beam from a laterally directed impact at a majority section of the length. Each stiffening member of the array of stiffening members extends between and is secured to the first and second walls of the elongated beam. Each stiffening member of the array of stiffening members comprises a wall portion that is disposed orthogonal to the third wall of the elongated beam and transverse to the length of the beam, such that the wall portion is configured to axially absorb the laterally directed impact.

Implementations of the disclosure may include one or more of the following optional features. In some examples, the elongated beam comprises a sill inner or a sill outer of a rocker assembly. Also, in some examples, the elongated beam and the array of stiffening members comprises a rocker insert, such that the rocker insert may be configured to be disposed within a hollow interior of a sill assembly having at least one of a sill outer and a sill inner defining the hollow interior. In some instances, each of the array of stiffening members are configured to carry a load path of the laterally directed impact between the inboard and outboard wall portions of the sill assembly.

In some implementation, each stiffening member of the array of stiffening members includes a flange portion protruding from the wall portion, where the flange portion is coupled to the first wall of the elongated beam. Also, in some examples, each stiffening member of the array of stiffening members may include a second flange portion that protrudes from the wall portion, where the second flange portion is coupled to the second wall of the elongated beam. Further, in some examples, each stiffening member of the array of stiffening members may include a third flange portion that protrudes from the wall portion, such that the third flange portion may be coupled to the third wall of the elongated beam.

The spaced arrangement of the array of stiffening members, in some implementations, is substantially equidistantly from each other. In some examples, the spaced arrangement of the array of stiffening members comprises a distance between each of the array of stiffening members along the length of the elongated beam, such that the distance of the spaced arrangement may be less than twice a depth dimension the array of stiffening members that is taken orthogonal to the length of the elongated beam.

In some examples, the wall portion of each stiffening member includes at least one stiffening rib that extends orthogonal to the third wall of the elongated beam.

According to another aspect of the disclosure, a rocker insert that is disposed within a hollow interior of a sill assembly is disclosed. The sill assembly including at least one of a sill outer having an outboard wall portion and a sill inner having an inboard wall portion defining the hollow interior. The rocker insert includes a first stiffening member that has a top wall, a bottom wall disposed parallel to the top wall, and a side wall extending between the top wall and the bottom wall, where the top wall, the bottom wall, and the side wall define a channel. A second stiffening member is disposed at least partially within the channel and comprises an array of transverse members that are coupled to the top wall and the bottom wall of the first stiffening member. Each of the transverse members are configured to carry a load path laterally between the inboard and outboard wall portions.

According to yet another aspect of the disclosure, a rocker insert which is disposed with a hollow interior of a sill assembly is disclosed. The sill assembly including at least one of a sill outer having an outboard wall portion and a sill inner having an inboard wall portion defining the hollow interior. The rocker insert includes a first stiffening member having a top wall, a bottom wall disposed parallel to the top wall, and a side wall extending between the top wall and the bottom wall. Moreover, the top wall, the bottom wall, and the side wall define a channel. The rocker insert also includes a second stiffening member disposed at least partially within the channel and comprising an array of transverse members coupled to the top wall and the bottom wall of the first stiffening member. Each of the transverse members are configured to carry a load path laterally between the inboard and outboard wall portions.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
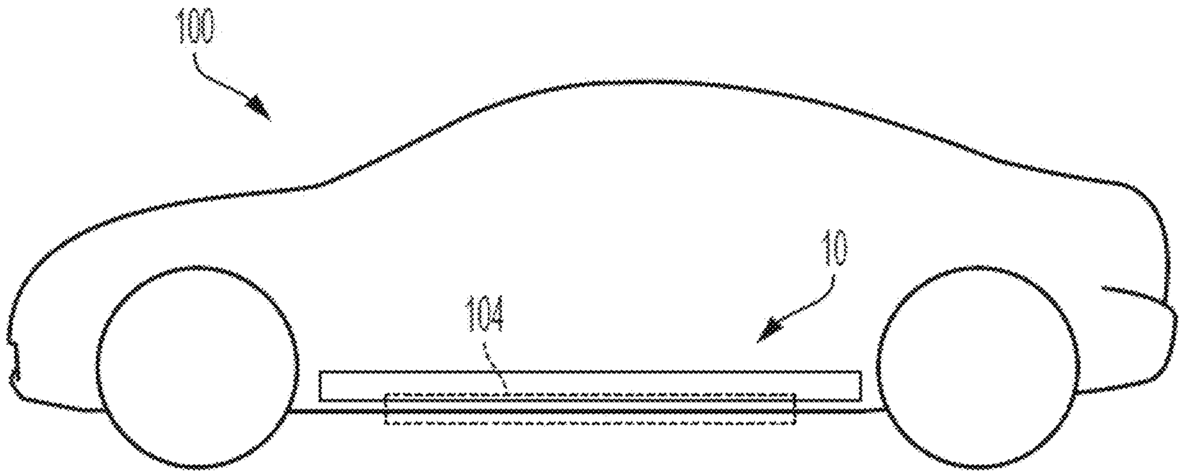
FIG. 1 is a side elevation view of a vehicle schematically showing a rocker assembly and a battery tray enclosure.
Figure 2:
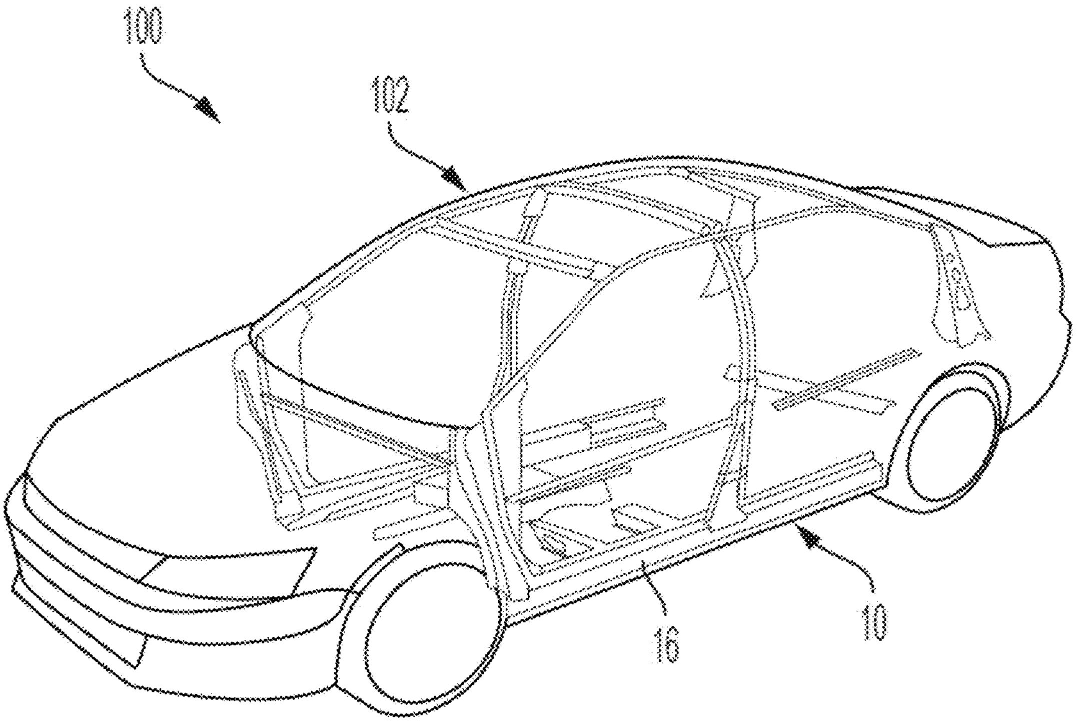
FIG. 2 is a perspective view of a vehicle schematically showing a rocker assembly and other structural components.

Referring now to the drawings and the illustrative embodiments depicted therein, a beam component is provided for a vehicle 100, such as for a body structure or frame 101 as shown in FIGS. 1 and 2. The vehicle frame 101 and associated components may have various designs and configurations, such as for different styles and types of vehicles. As shown for example FIGS. 1 and 2, the vehicle frame has various structural component, including a B-pillar 103, a hinge pillar 104, a floor cross-member 105, a roof bow 106, and a header 107, among other structural components that support the body of the vehicle and protect passengers, engine components, and sensitive electronics from damage when undergoing collisions. In some examples, the vehicle may be operated by a propulsion system that uses a battery, such as a battery or battery modules that may be supported in a battery tray 108 generally located between the axles and below the floor 109 to distribute the battery weight and establish a low center of gravity for the vehicle.

Figure 3:
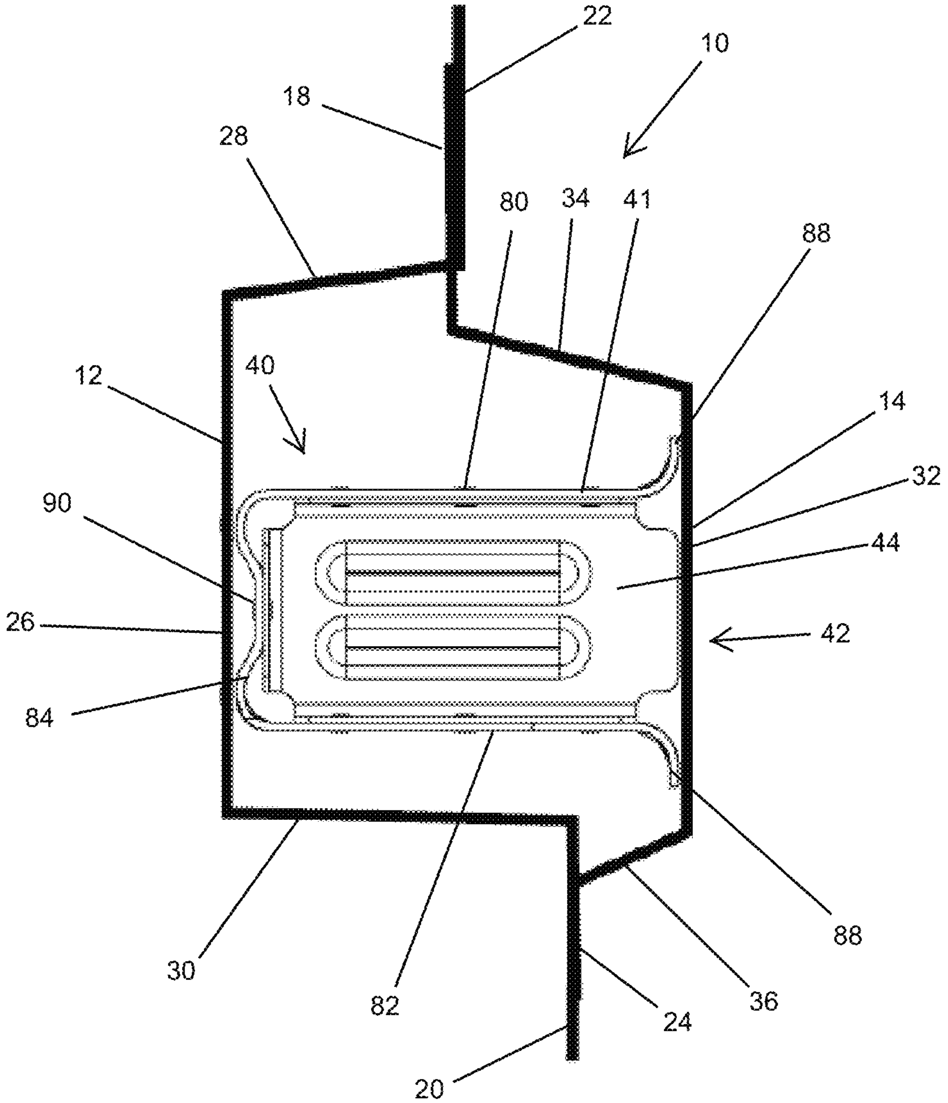
FIG. 3 is a cross-sectional view of an example of a vehicle rocker assembly including a rocker insert.

The beam component disclosed herein may be a rocker insert, a B-pillar, or a battery tray side member or another structural component that would benefit from the impact energy management properties provided and disclosed herein. The vehicle rocker component includes a sill panel or panels, such as a sill inner panel 12 and sill outer panel 14 that attach together around an interior area 16, where the terms “inner” and “outer” are made in reference to inboard or inward facing and outboard or outward facing directions on the vehicle, such oriented in FIG. 1. As shown in FIGS. 2 and 3, the example of the vehicle rocker assembly 10 is provided with a reinforcement insert disposed in the interior area 16 to form a multi-tubular rocker structure. The rocker assembly 10 shown in FIG. 2 is disposed alongside an outer section of a battery tray 108 with the floor cross-member 105 being attached to the vehicle rocker assembly 10 so as to span laterally over the battery tray 108. Accordingly, the vehicle component in additional implementations may also or alternatively be provided as a battery tray frame component, such as a longitudinally oriented side wall section of the battery tray.

When designing the vehicle rocker assembly with a rocker insert disclosed herein, the outer dimensions of the vehicle rocker assembly may be reduced and the overall weight of the vehicle rocker assembly may be reduced while meeting the required impact and loading conditions. The rocker insert may span a partial section of the vehicle rocker assembly or the entire length of the rocker assembly, such as to extend beyond the rocker assembly into and to also reinforce an adjacent component. The rocker insert disclosed herein may comprise the entire vehicle component or may be joined to additional reinforcements or parts of the vehicle component, such as at desired sections of the vehicle component. Further, in some examples the rocker assembly may be embodied as a subassembly or as part of a corresponding vehicle component, such as a structural component or a battery tray component and as such may be designed to undergo various impact forces and to support and sustain different loading conditions.

Moreover, the rocker insert disclosed herein may be formed with one or more pieces of sheet material, such as by roll forming a metal sheet, to provide the structure with a relatively high strength (for shear and axial loading) and low weight in comparison to common rocker panels, such as to allow the sill panels of the corresponding vehicle component (if provided) to use less material, occupy a smaller packaging space, and have greater flexibility in the outer shape design. The cross-sectional shape of different examples of the vehicle component and rocker insert may include various shapes and thicknesses for the desired application of the vehicle component. In addition, some implementations of the rocker insert may include an aluminum extrusion that is assembled with a metal sheet material.

Unless specified to the contrary, it is generally understood that additional implementations of the rocker component may have an opposite orientation from the examples shown and described, such as where the sill panels identified as an inner panel may be used as the outer panel and the sill panels identified as an outer panel may be used as the inner panel. The cross-sectional shape of the inner and outer panels may vary along the rocker, such as, for example, by flaring outward at the ends.

Referring now to the vehicle rocker assembly 10 shown in FIG. 3, a first sill panel 12 and a second sill panel 14 are attached together to surround a hollow interior space 16 between the sill panels 12, 14. The vehicle rocker assembly 10 shown in FIG. 3 is embodied as a vehicle rocker component. Accordingly, the first sill panel 12 may be referred to as a sill inner panel of a rocker component. The first sill panel 12 has an upper flange 18 and a lower flange 20 that extend along respective upper and lower edges of the inner panel. The first sill panel 12 protrudes inboard from the upper and lower flanges 18, 20 to form outward facing concave structures. The second sill panel 14, which may be referred to as a sill outer panel of a rocker component, has a C-shaped cross section with flanges 22, 24, which may similarly be referred to as an upper flange 22 and a lower flange 24. The upper flanges 18, 22 and the lower flanges 20, 24 of the inner and outer sill panels 12, 14 are attached together, such as via welding, with the concave structures facing each other. The upper and lower flanges 18, 20, 22, 24 of each of the sill panels 12, 14 shown in FIG. 3 extend longitudinally, continuously along the edges of the rocker component; however, it is contemplated that the flanges may be trimmed away in select areas to facilitate frame attachment or to reduce weight.

As further shown in FIG. 3, the inner and outer sill panels 12, 14 are joined together to define a hollow interior space 16 between the sill panels 12, 14. The upper and lower flanges 18, 20, 22, 24 are substantially planar and oriented in a generally vertical configuration, such as to mate in generally continuous contact along the length of the component. The upper and lower flanges 18, 20, 22, 24 may be joined together via welding, and preferably spot welding, although it is conceivable that alternative welding methods or joining means may be used in addition or in the alternative to spot welding in different implementations of a rocker component, such as adhesive or fasteners or the like.

The first sill panel 12, or inner panel of the vehicle rocker assembly 10, has an inner wall 26 that is substantially planar. The inner wall 26 integrally interconnects with a corner transition to an upper wall 28 and a lower wall 30 at the respective upper and lower ends. The corner transitions are approximately 90 degrees between the inner wall 26 and the upper and lower walls 28, 30. Also, the corner transitions are defined by the longitudinal bends to a sheet material that forms the first sill panel 12, such as a metal sheet (e.g., an advanced high strength steel sheet or aluminum sheet). Similarly, the upper and lower walls 28, 30 each have a corner transition of approximately 90 degrees to the upper flange 18 and the lower flange 20, respectively. The corner transitions are also defined by longitudinal bends in the sheet material of the first sill panel 12, such as formed by a roll form process. As also shown in FIG. 3, the upper and lower flanges 18, 20 are substantially planar and oriented in parallel alignment with the planar extent of the inner wall 26. The upper and lower walls 28, 30 of the first sill panel 12 are also substantially planar and, as shown in FIG. 3, are substantially parallel to each other, although in additional examples they may be slightly angled from each other. The corner transitions may also have an angular transition greater or less than shown in FIG. 3, such as approximately between 40 and 120 degrees, between 70 and 100 degrees, between 80 and 95 degrees, or between 82 and 92 degrees.

As also shown in FIG. 3, the second sill panel 14 or outer panel of the vehicle rocker assembly 10 has an outer wall 32 that is substantially planar and integrally interconnects with an upper wall 34 and a lower wall 36 at its respective upper and lower ends. The corner transitions of approximately 80 degrees between the outer wall 32 and the upper and lower walls 34, 36 are defined by longitudinal bends to a sheet material that forms the second sill panel 14. The sheet material may be the same or different from the first sill panel 12 and may include a metal sheet, such as an advanced high strength steel sheet or aluminum sheet. Similarly, the upper wall 34 also has a corner transition to the upper flange 22 and the lower wall 36 has a corner transition to the lower flange 24, which are each also defined by longitudinal bends in the sheet material of the second sill panel 14. Again, the corner transitions between the upper and lower walls 34, 36 and the upper and lower flanges 22, 24 and the outer wall 32 may have an angular transition greater or less than shown in FIG. 3, such as approximately between 40 and 120 degrees, between 70 and 100 degrees, between 80 and 95 degrees, or between 82 and 92 degrees.

As shown in FIG. 3, the upper and lower flanges 22, 24 are substantially planar and oriented in parallel alignment with the planar extent of the outer wall 32. The upper and lower walls 34, 36 of the second sill panel 14 are also substantially planar, but are slightly angled from being orthogonal to the outer wall 32 and flanges 22, 24. With the flanges 18, 20, 22, 24 of the panels 12, 14 attached together, the walls thereof define a substantially hexagonal cross-sectional shape; however, it is appreciated that additional examples of the rocker insert may have various alternative cross-sectional shapes (e.g., a substantially rectangular shape) and different wall configurations for the corresponding vehicle design (e.g., portions of the inner or outer walls that are not vertically oriented). It is also contemplated that in other examples the outer sill 14 and the inner sill may each include a different configuration including but not limited to the outer sill having an inward or outward protruding stiffening rib portion configured to provide additional stiffness and side impact support.

Figure 4:
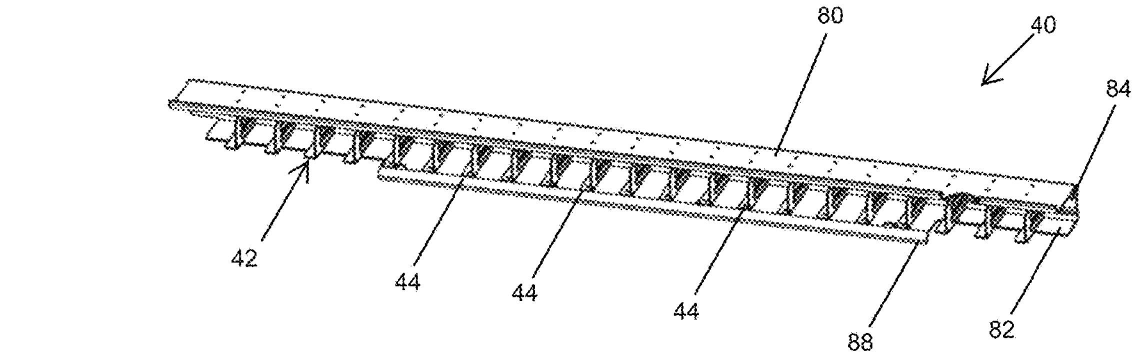
FIG. 4 is a top perspective view of the rocker insert shown in FIG. 3.
Figure 5:
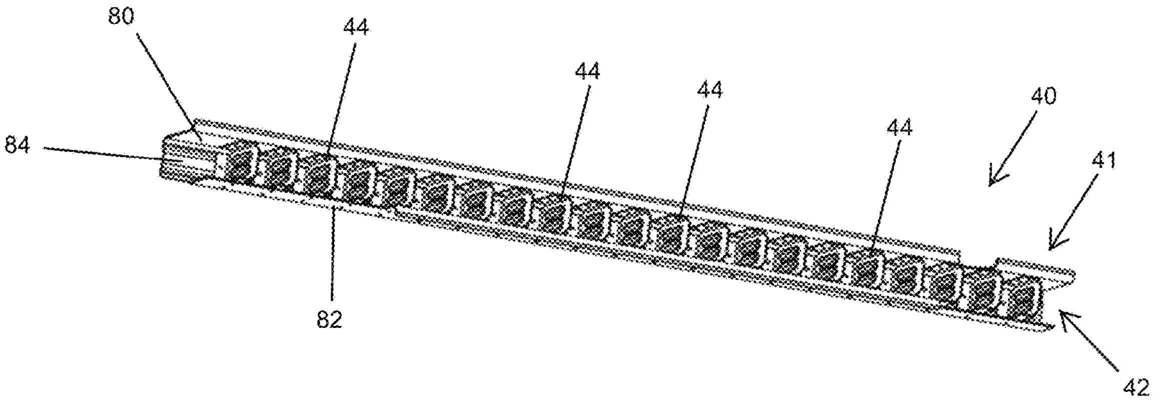
FIG. 5 is a bottom perspective view of the rocker insert shown in FIG. 4.
Figure 6:
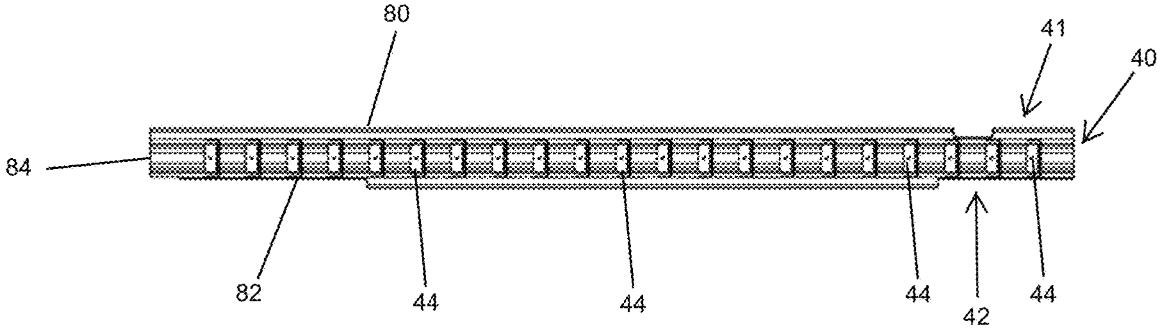
FIG. 6 is a side plan view of the rocker insert shown in FIG. 4.
Figure 7:
FIG. 7 is an opposite side plan view of the rocker insert shown in FIG. 4.
Figure 8:
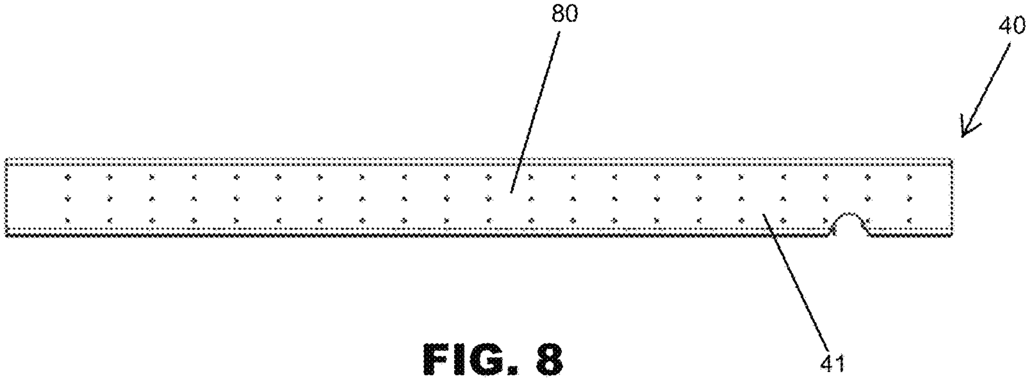
FIG. 8 is a top plan view of the rocker insert shown in FIG. 4.
Figure 9:
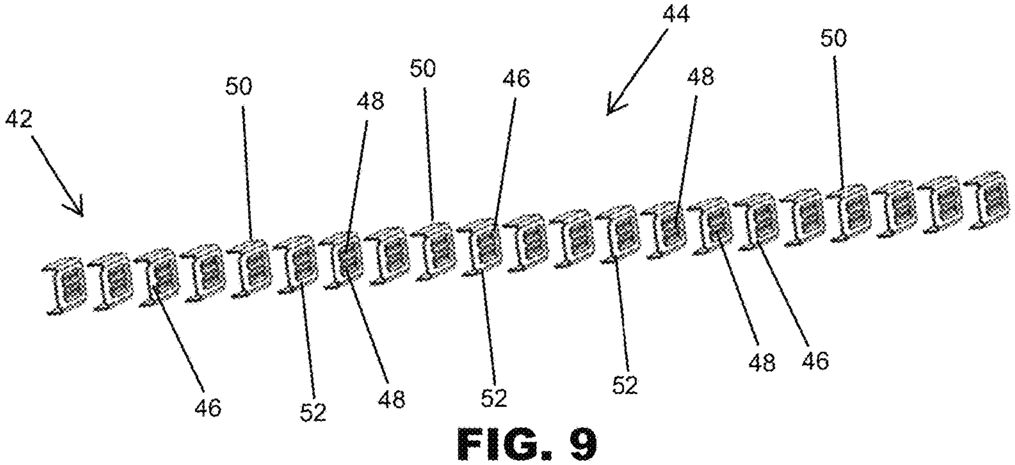
FIG. 9 is a side perspective view of a second stiffening member of the rocker insert shown in FIG. 4.
Figure 10:
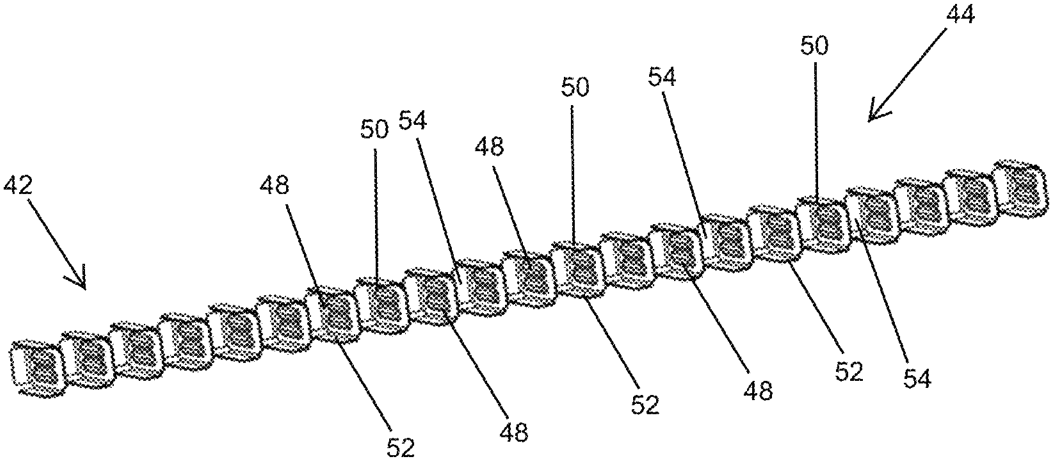
FIG. 10 is an opposite side perspective view of the second stiffening member of the rocker insert shown in FIG. 4.

As further shown in FIGS. 3 and 4, the vehicle rocker assembly 10 includes a rocker insert 40 disposed within the elongated hollow interior 16. The rocker assembly 10 includes a first stiffening member 41 which includes at least two of a top wall 80, a bottom wall 82, a first side wall 84, and second side wall. In the example shown in FIGS. 3 and 4, the first stiffening member 41 includes the top wall 80, the bottom wall 82 disposed generally parallel to the top wall 80, and a first side wall 84 which extends between the top wall 80 and the bottom wall 82. As a result, the cross section of the first stiffening member 41 includes a C-shape. The top wall 80, the bottom wall 82, and the side wall 84 define a channel along the length of the rocker insert. In one example, the top wall 80 and the bottom wall 82 have a width which extends at least 50% of the width between the outer sill 14 and the inner sill 12. In other examples, the top wall 80 and the bottom wall 82 have a width which extends more than 50% of the width between the outer sill 14 and the inner sill 12.

In one example, the top wall 80 and the bottom wall 82 are generally flat parallel extending surfaces, however various other implementations have been contemplated including corrugation disposed on one or more of the top wall 80 and the bottom wall 82. In the example shown, the top wall 80 and the bottom both have flange portions 88 which extend at an angle from the top wall 80 and the bottom wall 82. The angle between the flange and the top or bottom wall 82 may be approximately ninety degrees, however, various other angles have been contemplated including but not limited to angles in the range of 25-125 degrees, angles in the range of 35-115 degrees, angles in the range of 45-105 degrees, angles in the range of 60-100 degrees, angles in the range of 80-100 degrees, and angles in the range of 85-95 degrees.

The flange portions 88 are configured to allow the rocker insert 40 to be coupled to another vehicle component such as a sill inner, a sill outer, or other vehicle component. In one example one or more of the flange portion 88 of the top wall 80 and the flange portion 88 of the bottom wall 82 are coupled to the sill inner 12. In this case, the rocker insert 40 replaces a traditional sill outer 14 such that a separate sill outer is not needed. In another example, one or more of the flange portion 88 on the top wall 80 and the flange portion 88 of the bottom wall 82 are coupled to a sill outer 14. In this case, the rocker insert 40 replaces a traditional sill inner 12 such that a separate sill inner is not needed. In one example, the coupling between the flange portion/portions 88 and the sill inner 12 or sill outer 14 is direct coupling done through welding. However, various other configurations have been contemplated including but not limited to indirect coupling such that another component is disposed between the flange portion(s) and the sill inner or sill outer.

Moreover, in the example shown, the side wall 84 curves outward from both the top wall 80 and the bottom wall 82 before curving back inwards, towards the channel, and meeting at a recessed portion 90. In some examples, the recessed portion 90 is curved such that it has a generally u-shape, however various other shapes have been contemplated. In some examples, one or more of the top wall 80 or the bottom wall 82 may include cut-outs to accommodate other vehicle components without departing from the spirit of the invention.

Referring still to the example shown in FIGS. 3 and 4, it is contemplated that one of the side wall 84 and or the flange portions 88 of the top and bottom wall 80, 82 may be coupled to one of the inner sill 12 or the outer sill 14 to support the rocker insert 40 in the elongated hollow interior 16. Again, this coupling may be through welding, however, other coupling methods have been contemplated including but not limited to the use of fasteners or adhesive. In one example, the side wall 84 is coupled to the inner sill 12. In another example, the side wall 84 is coupled to the outer sill 14. In another example, the flange portions 88 of the top and/or bottom wall 82 are coupled to the outer sill 14. In another example, the flange portions 88 of the top and/or bottom wall 82 are coupled to the inner sill 12.

Referring now to the example shown in FIGS. 4-13, the rocker insert 40 also includes a second stiffening member 42 disposed at least partially within the channel of the first stiffening member 41. In some examples, the second stiffening member 42 is completely disposed within the channel, however, various other configurations have been contemplated. Additionally, the second stiffening member 42 includes an array of transverse members 44 coupled to the top wall 80 and the bottom wall 82 of the first stiffening member. Each of the transverse members 44 are arranged and configured to carry a load path laterally between the inboard and outboard wall portions. Each of the transverse members 44 may include a base wall 46 extending vertically between the top wall 80 and the bottom wall 82. Moreover, the base wall 46 may be generally rectangular or square shaped. In some examples, the base wall 46 has a thickness of approximately 2-10 mm, however various other thicknesses have been contemplated.

As shown in FIGS. 4-10, the array of transverse members 44 includes a plurality of transverse members 44 disposed along the length of the rocker insert. In some examples, the array of transverse members 44 are arranged generally equidistantly at regular, uniform intervals along the length of the rocker insert. This arrangement provides consistent improved performance in along the length of the rocker insert. However, it is contemplated that one or more of the transverse members 44 arranged at regular uniform intervals may be omitted to provide space for additional vehicle components or packaging concerns. In some examples, the array of the transverse members 44 is arranged in a configuration such that as the array of transverse members 44 includes a first transverse member and a second transverse member and a lateral distance along the length of the rocker insert between the first transverse member and the second transverse member is not more than twice a length of the first transverse member. In other words, the distance between transverse members 44 is less than twice the length of a single transverse member. However, various other configurations have been contemplated including the distance between transverse members 44 being less than or approximately equal to the length of a single transverse member. In some examples, there are 15-30 transverse members 44 disposed along the length of the rocker insert. In some examples, there are 10-20 transverse members 44 disposed along the length of the rocker insert. In some examples, there are more than five transverse members 44 disposed along the length of the rocker insert.

Figure 11:
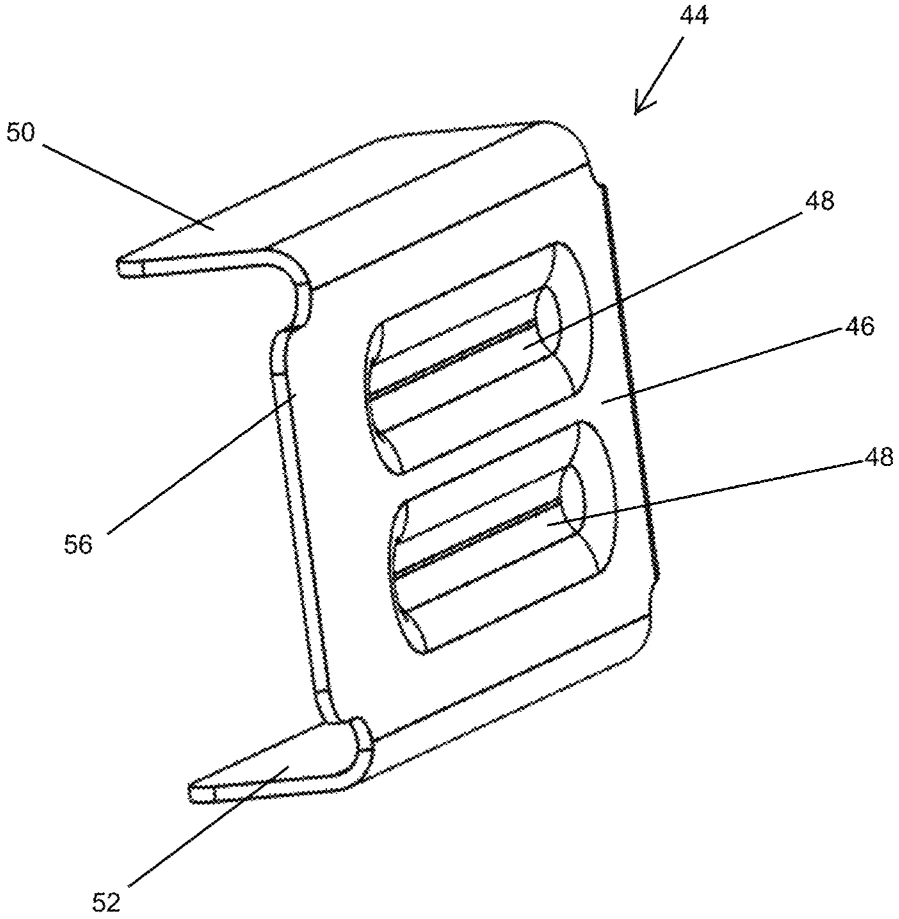
FIG. 11 is a side perspective view of a transverse member of the second stiffening member of the rocker insert shown in FIG. 4.
Figure 12:
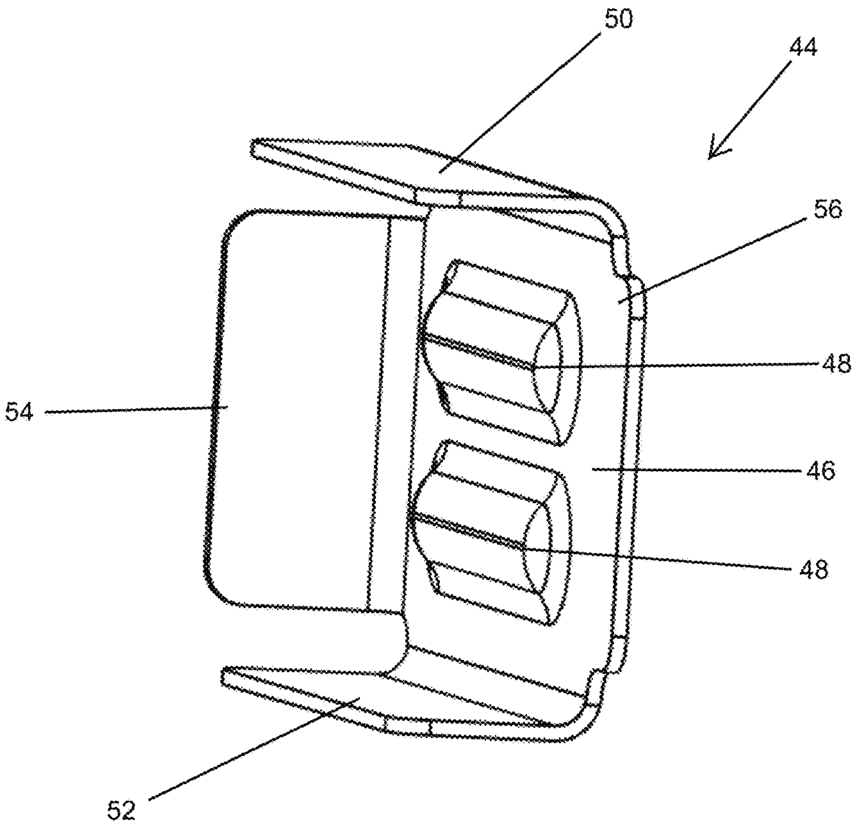
FIG. 12 is an opposite side perspective view of a transverse member of the second stiffening member of the rocker insert shown in FIG. 11.
Figure 13:
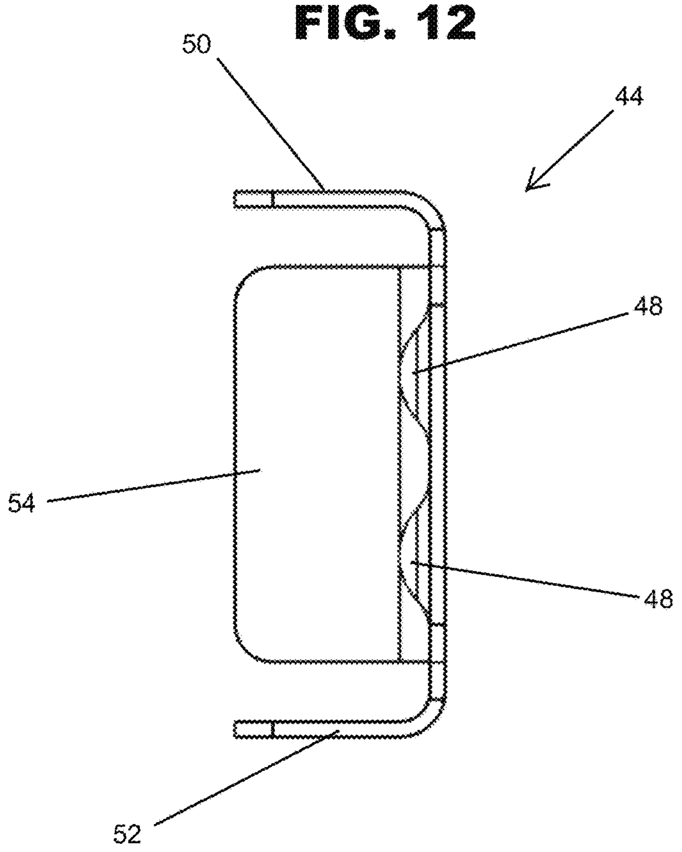
FIG. 13 is a side plan view of the transverse member shown in FIG. 11.
Figure 14:
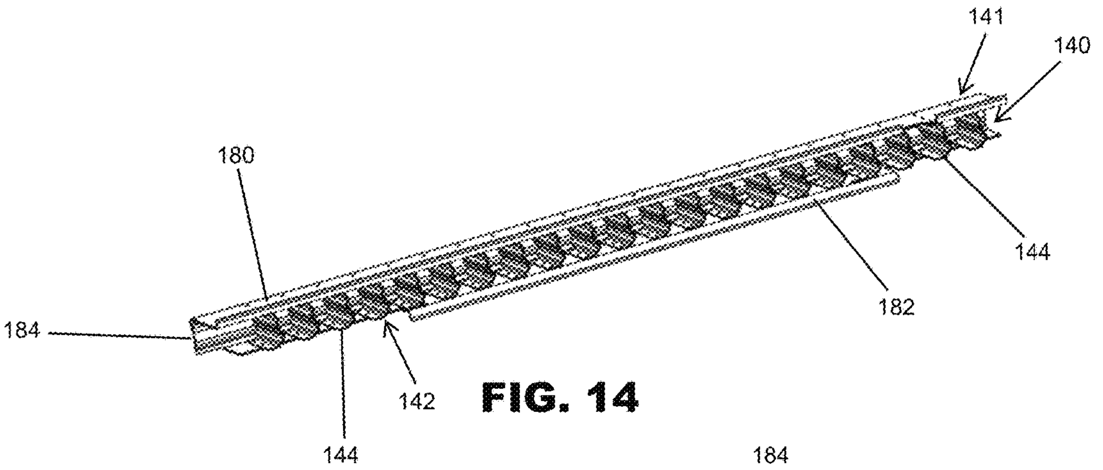
FIG. 14 is a side perspective view of another example of a rocker insert.
Figure 15:
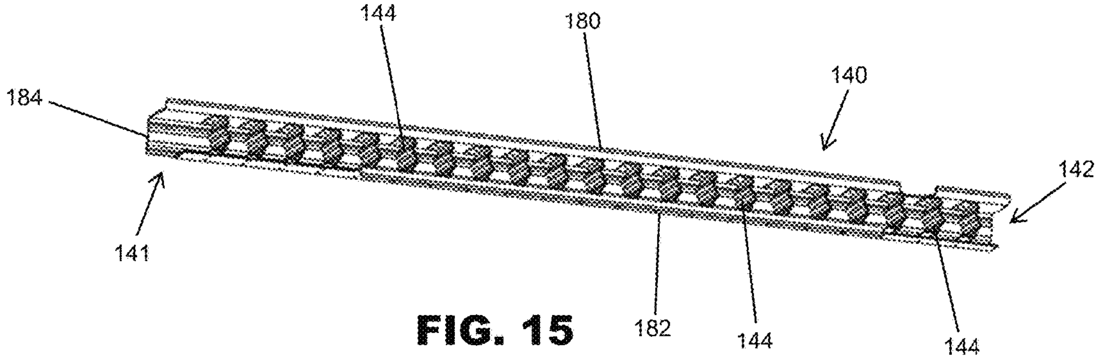
FIG. 15 is another side perspective view of the rocker insert shown in FIG. 14.
Figure 16:
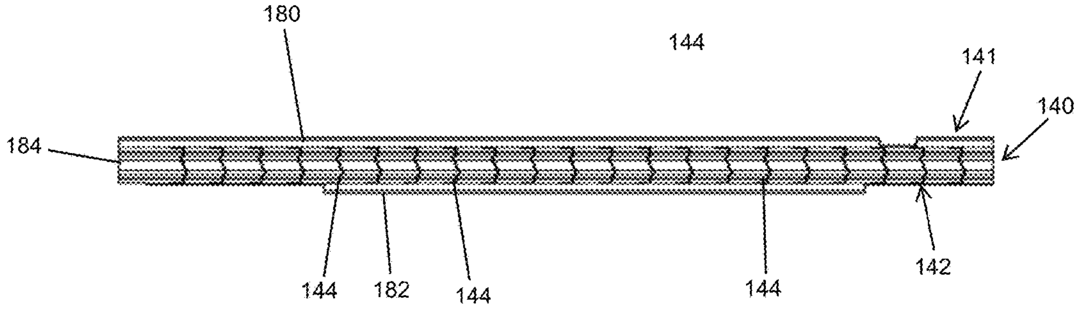
FIG. 16 is a side plan view of the rocker insert shown in FIG. 14.
Figure 17:
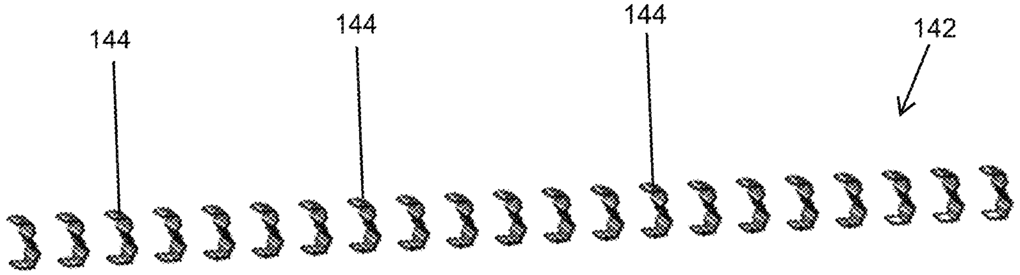
FIG. 17 is a side perspective view of the rocker insert shown in FIG. 14 having the first stiffening member removed for viewing clarity.
Figure 18:
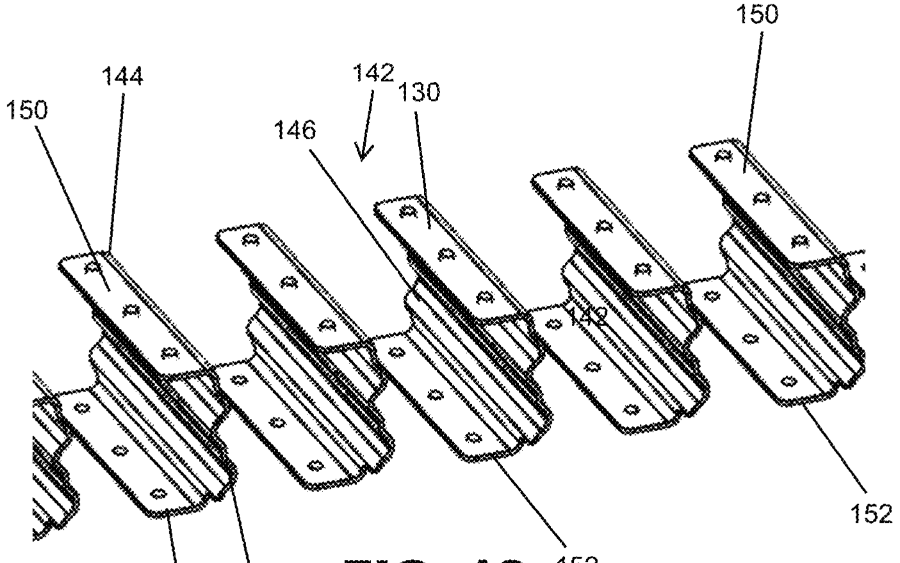
FIG. 18 is a partial close up of a side perspective view of the rocker insert shown in FIG. 17.
Figure 19:
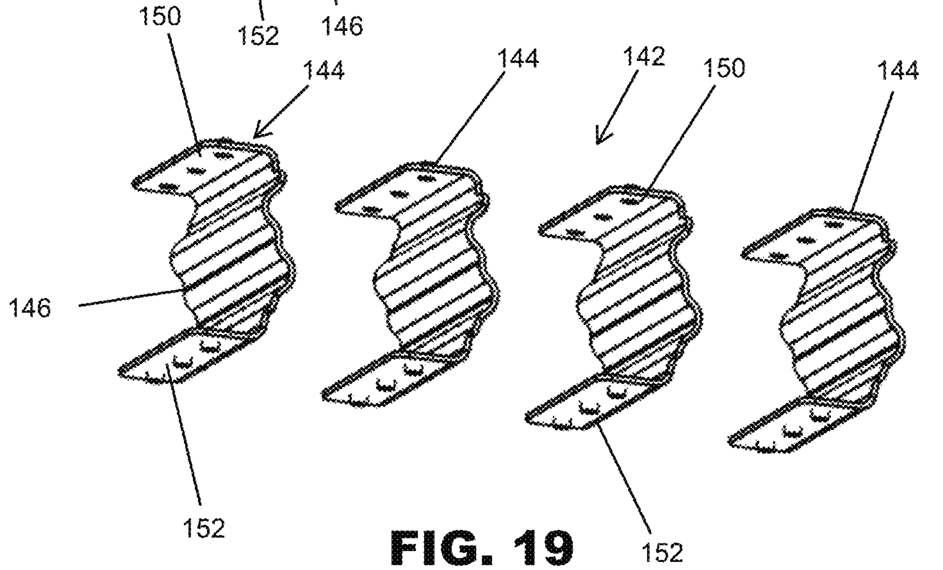
FIG. 19 is partial close up view of another side perspective view of the rocker insert shown in FIG. 17.
Figure 20:
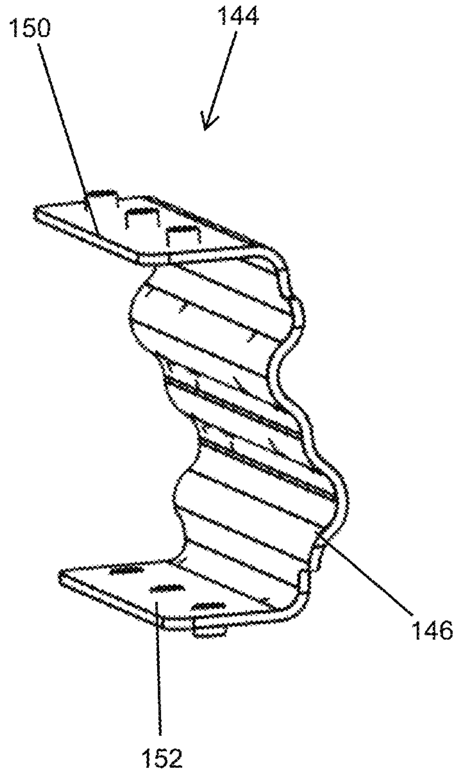
FIG. 20 is a side perspective view of the transverse member of FIG. 17.
Figure 21:
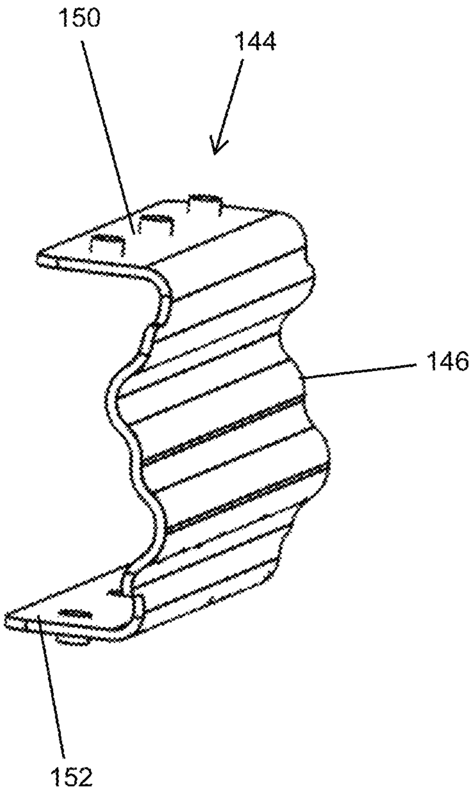
FIG. 21 is another side perspective view of the transverse member of FIG. 17.
Figure 22:
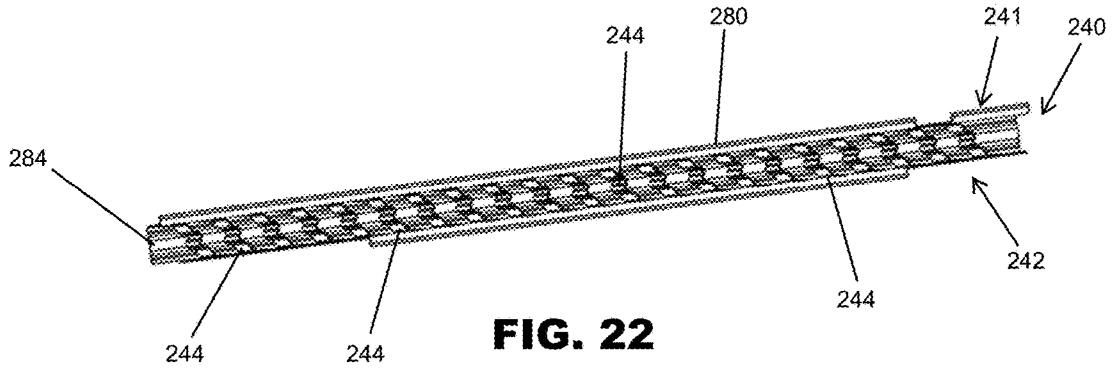
FIG. 22 is a side perspective view of another example of a rocker insert.
Figure 23:
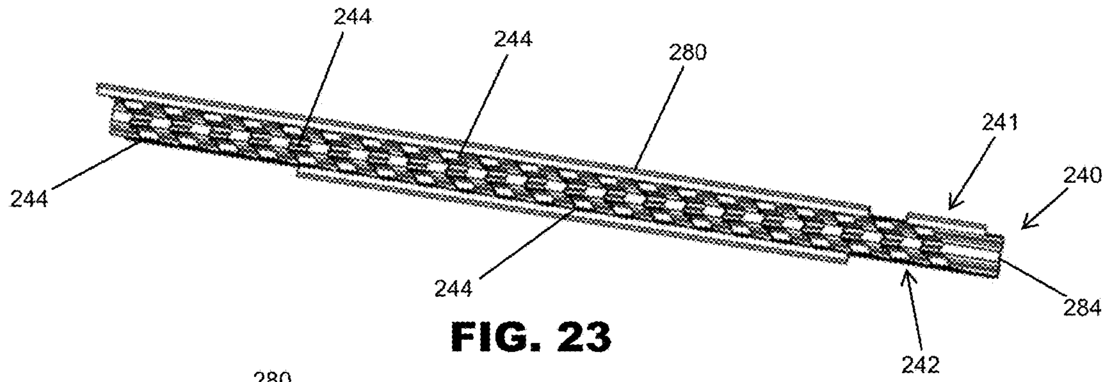
FIG. 23 is another side perspective view of the rocker insert shown in FIG. 22.
Figure 24:
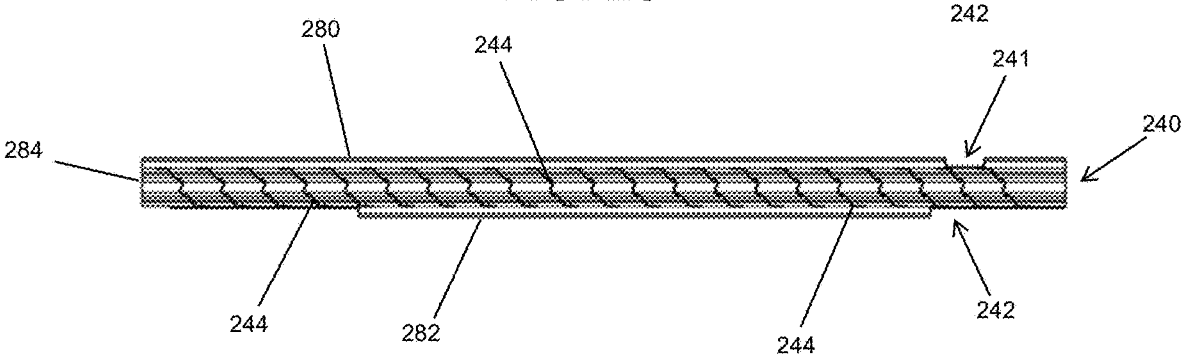
FIG. 24 is a side plan view of the rocker insert shown in FIG. 22.
Figure 25:
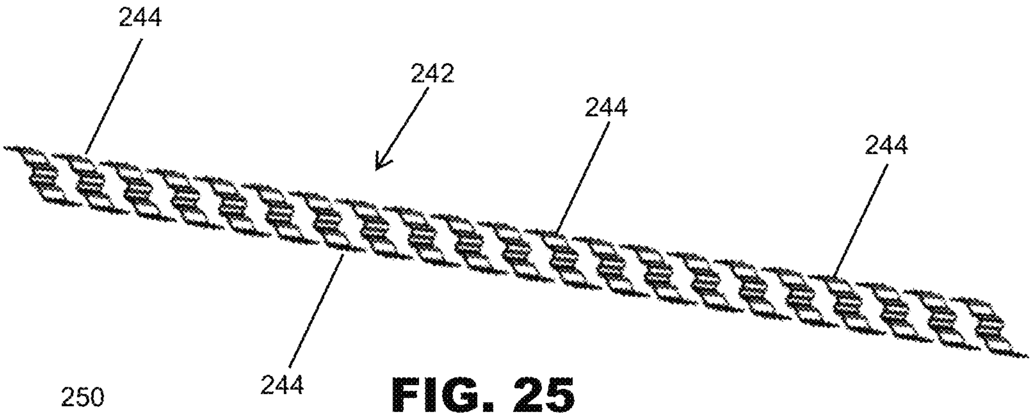
FIG. 25 is a side perspective view of the rocker insert shown in FIG. 22 having the first stiffening member removed for viewing clarity.
Figure 26:
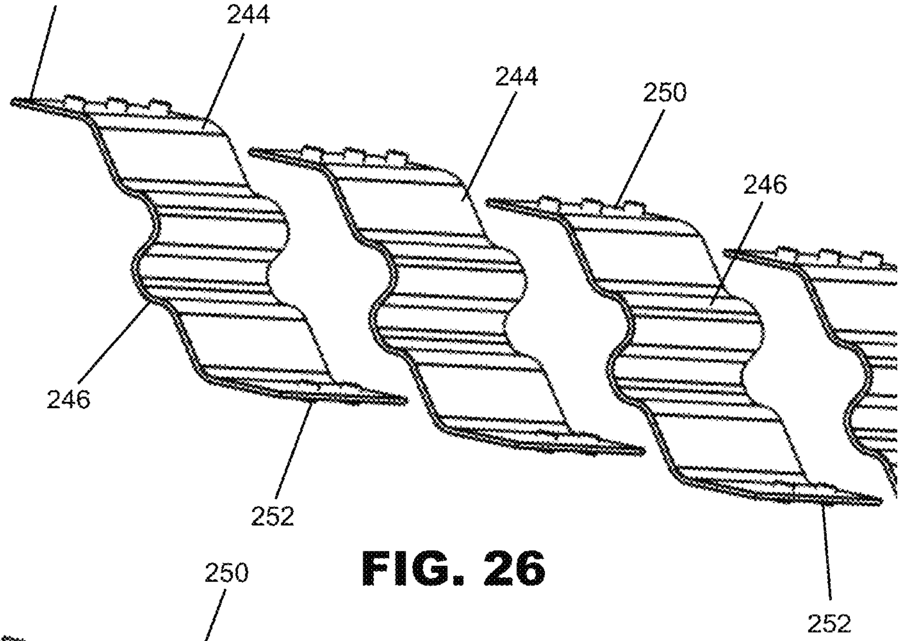
FIG. 26 is a partial close up of a side perspective view of the rocker insert shown in FIG. 25.
Figure 27:
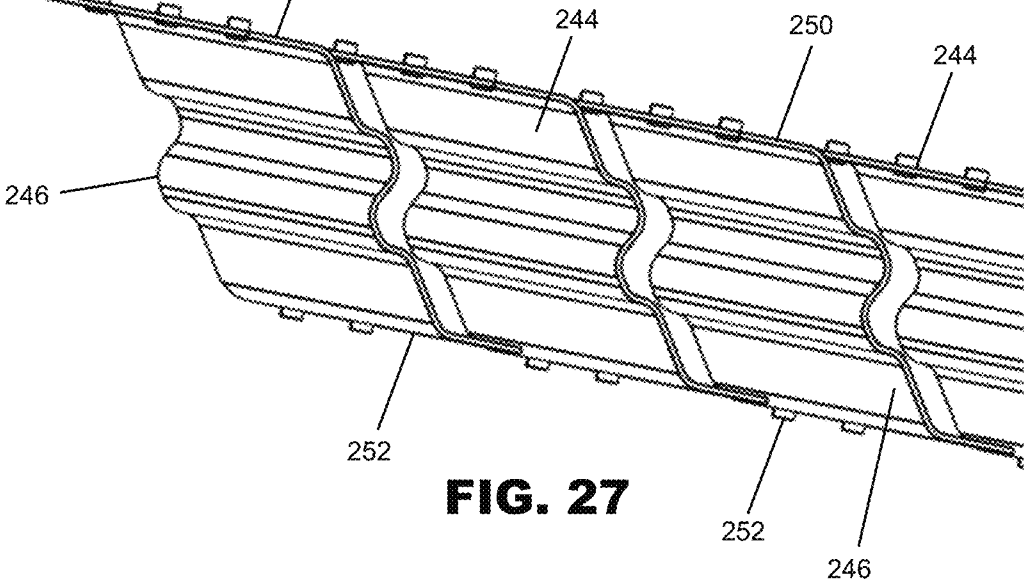
FIG. 27 is partial close up view of another side perspective view of the rocker insert shown in FIG. 25.
Figure 28:
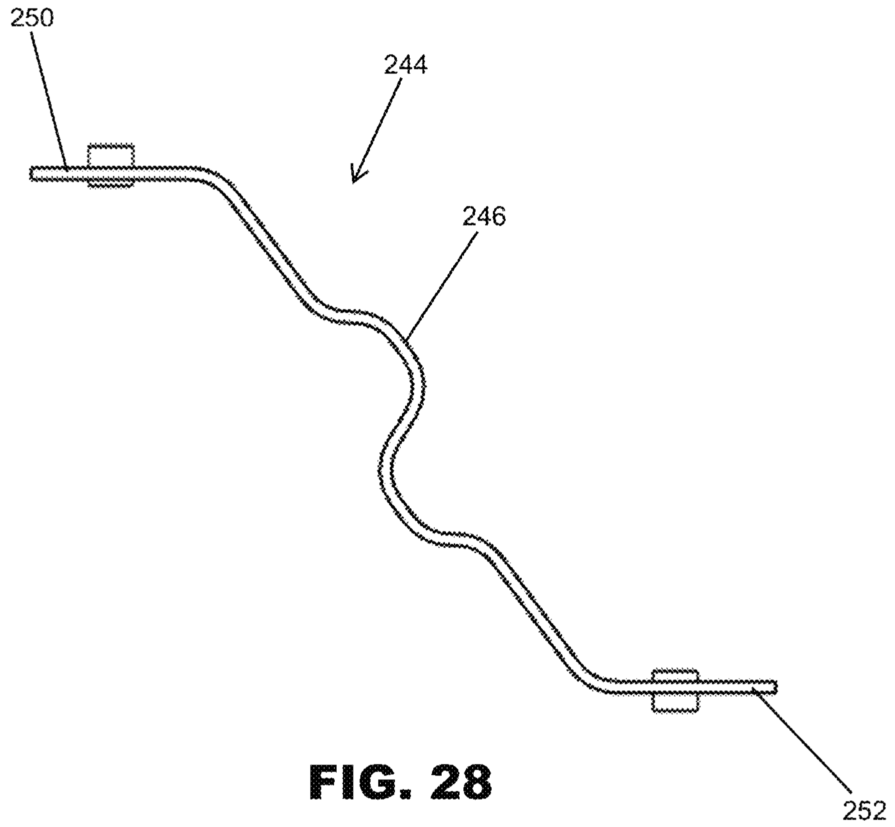
FIG. 28 is a side plan view of the transverse member of FIG. 22.
Figure 29:
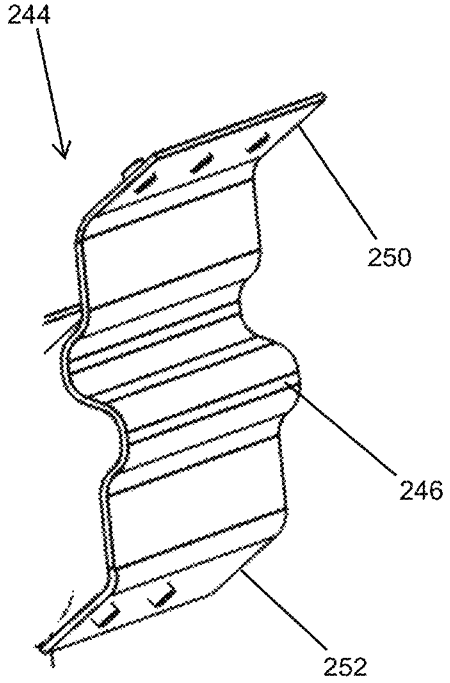
FIG. 29 is a side perspective view of the transverse member of FIG. 22.
Figure 30:
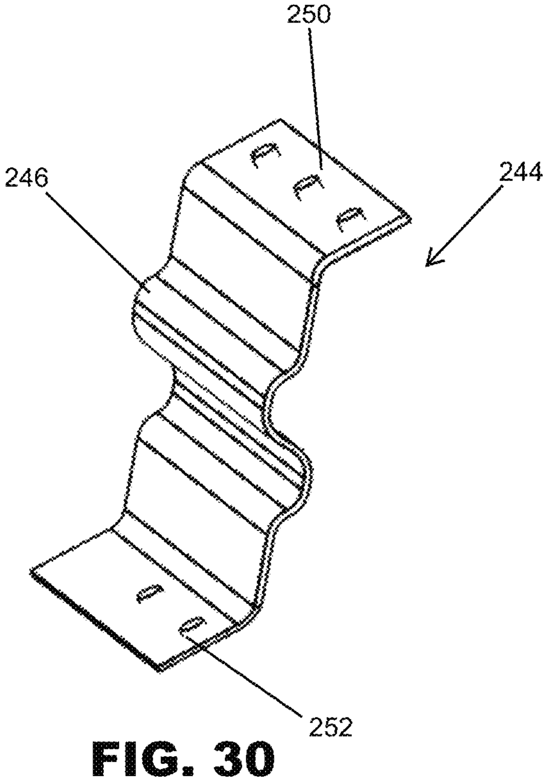
FIG. 30 is another side perspective view of the transverse member of FIG. 22.

In some examples, as shown in FIGS. 11-13, the base wall 46 may include one or more protrusions 48 extending from the base wall 46. The protrusions 48 may be configured to provide additional strength to the base wall 46. In the example shown in FIG. 11, the base wall 46 includes two protrusions 48 which have a generally rounded shape and are disposed generally equidistant from each of the top and bottom walls 80, 82. However, various other protrusion configurations have been contemplated including but not limited to more or less protrusions 48, angled protrusions 48, and/or protrusions 48 which are disposed at varying locations along the base wall 46.

Referring still to FIGS. 11-13, each of the transverse members 44 also includes a top flange 50 coupled to the top wall 80 of the first stiffening member and a bottom flange 52 coupled to the bottom wall 82 of the first stiffening member. The top flange 50 extends approximately perpendicular to the base wall 46 and parallel with the top wall 80 of the first stiffening member 41. Similarly the bottom flange 52 extends approximately perpendicular to the base wall 46 and parallel with the bottom wall 82 of the first stiffening member 41. In some examples, such as the example illustrated in FIG. 11, the top flange 50 and the bottom flange 52 extend in the same direction. However, it is also contemplated that the top flange 50 and the bottom flange 52 may extend in opposite directions. In some examples, such as the example illustrated in FIG. 11, the top flange 50 and the bottom flange 52 extend at a same length as one another. However, it is also contemplated that the top flange 50 and the bottom flange 52 may have different lengths. Moreover, in the example shown in FIG. 11, the top flange 50 and the bottom flange 52 have the same thickness as one another, and as the base wall 46. However, other thicknesses have been contemplated including but not limited to one or more of the top flange 50 and the bottom flange 52 having thicknesses which are different from each other and/or the base wall 46. In some examples, the top flange 50 and the bottom flange 52 are secured to the top wall 80 and the bottom wall 82, respectively, of the first stiffening member. In some examples, the flanges are secured to the first stiffening member using welding, however, various other coupling methods have been contemplated.

In some examples, such as the example shown in FIG. 12, each of the transverse members 44 include a side flange 54 coupled to the side wall of the first stiffening member. In some examples, the side flange 54 is coupled to the side wall of the first stiffening member through welding, however, various other coupling methods have been contemplated. Additionally, the side flange 54 extends perpendicularly to the base wall 46 and parallel to the side wall of the first stiffening member. In some examples, the side flange 54 has the same length and thickness as one or more of the top flange 50 or the bottom flange 52, however, various other configurations have been contemplated including but not limited to the side flange 54 having a different length and or thickness as one or more of the top flange 50 or the bottom flange 52. In some examples, the transitions between the top flange 50, the bottom flange 52, the side flange 54 and the base wall 46 are curved transitions, however, various other configurations have been contemplated including angled transitions. In some examples, each of the transverse members 44 may include a second side flange 56 extending from an opposite side edge. However, the second side flange 56 extends in the same plane as the base wall 46.

In the example shown in FIGS. 4-10, each of the transverse members 44 are identical. However, it has also been contemplated that one or more of the transverse members 44 may be dissimilar from the remainder of transverse members 44 to allow room for additional vehicle components, weight purposes, packaging concerns, or the like.

In one example, each of the transverse members 44 are formed from a flat sheet, typically coiled steel or aluminum, which is then cut and/or roll-formed or otherwise bent into the desired shape. It is also contemplated that the transverse members 44 may be comprised of another material having the desired strength requirements and/or from non-coiled steel or aluminum. It is also contemplated that the transverse members 44 may be formed by another method.

In one example, transverse members 44 are configured to carry a load path laterally between the inboard and outboard wall portions. In other words, the transverse members 44 extend at least partially between the sill inner and the sill outer, if included. The lateral vehicle direction generally extends across the width dimension of the vehicle. In contrast, the longitudinal vehicle direction generally extends along the length dimension of the vehicle.

The top and bottom wall 80, 82 of the first stiffening member 41 are configured to be supported by the second stiffening member 42 when undergoing the inboard lateral impact force to increase lateral bending strength of the rocker insert 40. In other words, the integration of the first stiffening member 41 with the second stiffening member 42, in the configuration as described, provides a cooperative structural effect that increases lateral bending strength of the rocker insert 40 leading to a lower failure risk or buckling threshold of the rocker insert during the lateral impact force, which may in turn increase the battery package space, resulting vehicle range, and overall safety of the vehicle.

Referring now to the example shown in FIGS. 14-21, the rocker insert 140 is similar to the rocker insert 40 shown in FIGS. 1-13, including but not limited to the first stiffening member 141 having a top wall 180, bottom wall 182, and side wall 184, along with the second stiffening member 142 disposed at least partially within the first stiffening member 141 and including the plurality of transverse members 144. However, in the example shown in FIGS. 14-21, the transverse members have a different shape than the example shown in FIGS. 1-13. More specifically, as illustrated in FIGS. 14-21, the transverse members 144 still include the top flange 150 configured to be coupled to the top wall 180 of the first stiffening member 141 and the bottom flange 152 configured to be coupled to the bottom wall 182 of the first stiffening member 141. However, while the example shown in FIGS. 1-13 extends generally planar, apart from recessed portions, from the top flange 150 to the bottom flange 152 the transverse member 144 has a wave-shaped profile. More specifically, adjacent to the top flange 150, the base wall 146 of the transverse member 144 extends towards the extension direction of the top flange 150 before curving back to a planar location and then extending away from the extension of the bottom flange 152, giving an overall wave-shaped profile. Various other configurations including more angled wave shaped profiles have been contemplated. Additionally, while no side flanges are illustrated in FIGS. 14-21, is has been contemplated that a similar shaped transverse member may include a side flange without departing from the spirit of the invention.

Referring now to the example shown in FIGS. 22-30, the rocker insert 240 is similar to the rocker insert 40 shown in FIGS. 1-13, including but not limited to the first stiffening member 241 having a top wall 280, bottom wall 282, and side wall 284, along with the second stiffening member 242 disposed at least partially within the first stiffening member 241 and including the plurality of transverse members 244. However, in the example shown in FIGS. 22-30, the transverse members 244 have a different shape than the example shown in FIGS. 1-13. More specifically, as illustrated in FIGS. 14-21, the transverse members 244 still include the top flange 250 configured to be coupled to the top wall 180 of the first stiffening member 141 and the bottom flange 252 configured to be coupled to the bottom wall 182 of the first stiffening member 141. However, while the example shown in FIGS. 1-13 includes the top and bottom flange coupled to the top wall and the bottom wall at the same, or similar lateral locations, the transverse members 244 are angled such that the top flange and the bottom flange are coupled to the top and bottom wall at different locations along the length of the first stiffening member 241. Further, the top flange extends in one direction while the bottom flange extends in the opposite direction. Additionally, in the example shown in FIGS. 22-30, the base wall 246 of transverse member 144 has a wave-shaped profile. More specifically, towards the top flange 150, the transverse member 144 extends towards away from the extension direction of the top flange 150 before curving back to a planar location and then extending away from the extension of the bottom flange 152, giving an overall wave-shaped profile. Various other configurations including more angled wave shaped profiles have been contemplated. Additionally, while no side flanges are illustrated in FIGS. 22-30, is has been contemplated that a similar shaped transverse member may include a side flange without departing from the spirit of the invention.

It is also contemplated that the internal reinforcements of the disclosed vehicle rocker assembly may be incorporated in other types of structural beams, such as in frames and structures of automotive and marine vehicles, buildings, storage tanks, furniture, and the like. With respect to vehicle applications, the vehicle component disclosed herein may be incorporated with various applications of different structural components. The vehicle component may be designed to support and sustain different loading conditions, such as for supporting certain horizontal spans or axial loading conditions. Also, the vehicle component may be designed to undergo various impact forces, such as for the illustrated rocker assemblies, pillar structures, and the like. The cross-sectional geometry, material type selections, and material thickness within the cross-sectional profile of the vehicle component may be configured for such a particular use and the desired loading and performance characteristics, such as the weight, load capacity of the beam, force deflection performance, and impact performance of the vehicle component.

For purposes of this disclosure, the term "coupled" (in all of its forms, couple, coupling, coupled, etc.) generally means the joining of two components (mechanical) directly or indirectly to one another. Such joining may be stationary in nature or movable in nature; may be achieved with the two components (mechanical) and any additional intermediate members being integrally formed as a single unitary body with one another or with the two components; and may be permanent in nature or may be removable or releasable in nature, unless otherwise stated.

Also for purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 15% of, within less than 5% of, within less than 1% of, and within less than 0.1% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle beam component comprising:

an elongated beam having a first wall, a second wall, and a third wall interconnecting the first and second walls to define a channel along a length of the elongated beam;

an array of stiffening members disposed in the channel and along the elongated beam in a spaced arrangement that is configured to stiffen the elongated beam from a laterally directed impact at a plurality of locations on a majority section of the length of the elongated beam, wherein each stiffening member of the array of stiffening members extends between and is secured to the first and second walls of the elongated beam, wherein each stiffening member of the array of stiffening members comprises a wall portion that is disposed orthogonal to the third wall of the elongated beam and transverse to the length of the beam, the wall portion configured to axially absorb the laterally directed impact, and wherein each stiffening member of the array of stiffening members includes a flange portion protruding from the wall portion, the flange portion coupled to the first wall of the elongated beam.

2. The vehicle beam component of claim 1, wherein each stiffening member of the array of stiffening members includes a second flange portion protruding from the wall portion, the second flange portion coupled to the second wall of the elongated beam.

3. The vehicle beam component of claim 2, wherein each stiffening member of the array of stiffening members includes a third flange portion protruding from the wall portion, the third flange portion coupled to the third wall of the elongated beam.

4. The vehicle beam component of claim 1, wherein the spaced arrangement of the array of stiffening members is substantially equidistantly from each other.

5. The vehicle beam component of claim 1, wherein the spaced arrangement of the array of stiffening members comprises a distance between each of the array of stiffening members along the length of the elongated beam, and wherein the distance of the spaced arrangement is less than twice a depth dimension the array of stiffening members that is taken orthogonal to the length of the elongated beam.

6. A vehicle beam component comprising:

an elongated beam having a first wall, a second wall, and a third wall interconnecting the first and second walls to define a channel along a length of the elongated beam;

an array of stiffening members disposed in the channel and along the elongated beam in a spaced arrangement that is configured to stiffen the elongated beam from a laterally directed impact at a plurality of locations on a majority section of the length of the elongated beam, wherein each stiffening member of the array of stiffening members extends between and is secured to the first and second walls of the elongated beam, wherein each stiffening member of the array of stiffening members comprises a wall portion that is disposed orthogonal to the third wall of the elongated beam and transverse to the length of the beam, the wall portion configured to axially absorb the laterally directed impact, and wherein the wall portion of each stiffening member includes at least one stiffening rib that extends orthogonal to the third wall of the elongated beam.

7. The vehicle beam component of claim 1, wherein the elongated beam comprises a sill inner or a sill outer of a rocker assembly.

8. The vehicle beam component of claim 1, wherein the elongated beam and the array of stiffening members comprises a rocker insert, and wherein the rocker insert is configured to be disposed with a hollow interior of a sill assembly having at least one of a sill outer having an outboard wall portion and a sill inner having an inboard wall portion defining the hollow interior.

9. The vehicle beam component of claim 8, wherein each of the array of stiffening members are configured to carry a load path of the laterally directed impact between the inboard and outboard wall portions of the sill assembly.

10. A rocker insert disposed with a hollow interior of a sill assembly, the sill assembly including at least one of a sill outer having an outboard wall portion and a sill inner having an inboard wall portion defining the hollow interior, the rocker insert comprising:

a first stiffening member having a top wall, a bottom wall disposed parallel to the top wall, and a side wall extending between the top wall and the bottom wall, wherein the top wall, the bottom wall, and the side wall define a channel; and an array of transverse members disposed at least partially within the channel and coupled to the top wall and the bottom wall of the first stiffening member, wherein upon undergoing a laterally directed impact at an exterior of the sill outer each of the transverse members are configured to carry a load path laterally between the inboard and outboard wall portions, and wherein each of the transverse members includes a top flange coupled to the top wall of the first stiffening member and a bottom flange coupled to the bottom wall of the first stiffening member.

11. The rocker insert of claim 10, wherein each of the transverse members include a side flange coupled to the side wall of the first stiffening member.

12. The rocker insert of claim 10, wherein the top flange and the bottom flange of each transverse member is coupled to the top wall and the bottom wall at a same location along a length of the rocker insert.

13. The rocker insert of claim 10, wherein the array of transverse members includes a plurality of transverse members arranged equidistantly from each other.

14. The rocker insert of claim 10, wherein the array of transverse members includes a first transverse member and a second transverse member and a lateral distance along the length of the rocker insert between the first transverse member and the second transverse member is not more than twice a length of the first transverse member.

15. The rocker insert of claim 10, wherein each of the transverse members includes at least one stiffening rib.

16. A vehicle rocker assembly comprising:

one or more of a sill outer or a sill inner to define an elongated hollow interior defined by one or more of an inboard wall portion of the sill inner and an outboard wall portion of the sill outer; and a rocker insert disposed within the elongated hollow interior, the rocker insert comprising:

a beam member having a top wall, a bottom wall disposed parallel to the top wall, and a side wall extending between the top wall and the bottom wall, wherein the top wall, the bottom wall, and the side wall define a channel; and a plurality of transverse members disposed at least partially within the channel and coupled to the top wall and the bottom wall of the first stiffening member, wherein each of the plurality of transverse members are configured to carry a load path laterally between the inboard and outboard wall portions, and wherein each of the transverse members includes a top flange coupled to the top wall of the beam member and a bottom flange coupled to the bottom wall of the beam member.

17. The vehicle rocker assembly of claim 16, wherein the plurality of transverse members are arranged equidistantly from each other.

18. The vehicle rocker assembly of claim 16, wherein each of the transverse members includes at least one stiffening rib.

19. A rocker insert disposed with a hollow interior of a sill assembly, the sill assembly including at least one of a sill outer having an outboard wall portion and a sill inner having an inboard wall portion defining the hollow interior, the rocker insert comprising:

a first stiffening member having a top wall, a bottom wall disposed parallel to the top wall, and a side wall extending between the top wall and the bottom wall, wherein the top wall, the bottom wall, and the side wall define a channel; and an array of transverse members disposed at least partially within the channel and coupled to the top wall and the bottom wall of the first stiffening member, wherein upon undergoing a laterally directed impact at an exterior of the sill outer each of the transverse members are configured to carry a load path laterally between the inboard and outboard wall portions, and wherein each of the transverse members includes at least one stiffening rib.

20. The rocker insert of claim 18, wherein the array of transverse members includes a first transverse member and a second transverse member and a lateral distance along the length of the rocker insert between the first transverse member and the second transverse member is not more than twice a length of the first transverse member.

* * * * *